3,830,777
REINFORCED POLYAMIDES CONTAINING FIBROUS ALKALI METAL TITANATES
Louis Lasseter Burton, Wilmington, Del., assignor to E. I. du Pont de Nemours and Company, Wilmington, Del.
No Drawing. Filed Dec. 17, 1973, Ser. No. 425,072
Int. Cl. C08g 51/04
U.S. Cl. 260—37 N                    17 Claims

ABSTRACT OF THE DISCLOSURE

A polyamide containing a particular mineral filler, a silane coupling agent and a fibrous alkali metal titanate. The presence of the titanate improves notch toughness, heat distortion temperatures, stiffness and produces molded articles with low warpage.

FIELD OF THE INVENTION

The invention relates to polyamide compositions containing reinforcing materials. More particularly, the invention relates to compositions of polyamide resins containing a mineral filler and an alkali metal titanate.

BACKGROUND OF THE INVENTION

It is known in the art to reinforce polyamide resins with various fillers, for example, glass, asbestos, wollastonite, silica, and the like. The filler is usually bonded to the polyamide through a silane coupling agent.

The filler is ordinarily chosen on the basis of the end use properties desired in the final article molded from the resin mixture. For some uses, such as automotive body parts, a resin is needed that is strong and tough, free of warpage, stiff, impact resistant and high-temperature-distortion resistant, and has good surface appearance. Polyamide resins containing a mineral filler such as wollastonite, or silica, have heat distortion temperatures that are generally too low to be of use in auto body parts. Furthermore, in molded parts that contain notches mineral filled polyamide resins do not have as good strength as is desirable in many applications. On the other hand, polyamide resins containing glass generally produce articles with a high heat distortion temperature and at high glass loadings (e.g., 30% by weight) acceptable notch toughness, but the high loading tends to degrade other properties such as surface appearance and Gardner impact strength. Furthermore, they tend to warp on subjection to high temperatures. Polyamides reinforced with wollastonite or silica and glass fibers offer no advantage over glass reinforced polyamide. In fact, notch toughness is inferior to glass reinforced polyamide.

The mineral-filled polyamide resins containing alkali metal titanate that are provided by this invention overcome the deficiencies mentioned above in glass fiber containing products and produce molded articles having high heat distortion temperatures and good strength properties (both tensile and notch toughness) and generally good impact strength. They also have better elongation properties, have an esthetically pleasing surface appearance, and produce low warpage compared to polyamide reinforced with mixtures of mineral and glass fiber.

SUMMARY OF THE INVENTION

This invention provides a polyamide composition comprising (1) 50–75% by weight based on the weight of the composition of at least one high molecular weight polyamide, (2) between about 20–48.5% by weight based on the weight of the composition of a particulate mineral filler comprising silica or a metallic silicate having a moisture content of less than 2% by weight of the filler and having at least 70% of its particles less than 10 microns in size and having an average particle size of between about 1–5 microns, (3) between about 0.25 and 2% by weight based on the weight of the mineral filler of a silane coupling agent, and (4) between about 1 and 20% by weight based on the weight of the composition of a fibrous alkali metal titanate containing less than 5% water by weight of the titanate.

DESCRIPTION OF THE INVENTION

The polyamides useful in this invention are the high molecular weight polyamides normally employed in polyamide resins used to make molded articles. Thus the term "high molecular weight polyamide" is used in the molding art, and the polyamides employed in the resin composition will have a relative viscosity of between about 40 and 80 as measured and described in ASTM D–789–72. Examples of such high molecular weight polyamides include polyhexamethylene adipamide, polycaprolactam, polydodecyl adipamide, polytetramethylene adipamide, polyhexamethylene sebacamide, polyhexamethylene dodecamide, and copolymers such as caprolactam and hexamethylene adipamide, as well as blends of the foregoing, particularly a blend of polyhexamethylene adipamide and about 5–25% by weight of polycaprolactam.

The particulate mineral fillers useful herein include silica (crystalline or amorphous) or a metallic silicate such as calcium silicate or aluminum silicate. The filler should have a moisture (water) content of less than about 2% by weight in order to obtain the improved properties of the articles molded from the resins of this invention, and thus, in some instances the filler should be the calcined form. In addition, the properties of the molded article depend in part on the size of mineral filler particles employed and it has been found that at least 75% of the particles, by weight, should have a size less than 10 microns and that the average filler particle size should be between about 1 and 5 microns. Preferably, at least 98% of the particles by weight should have a size less than 10 microns and the particles should have an average size less than 1–3 microns. Further, in a preferred composition the mineral filler will comprise between about 25% and about 35% by weight.

The compositions require the presence of a silane coupling agent to bond the mineral filler and the alkali metal titanate to the polyamide. These are known coupling agents and include amino-, epoxy-, and vinyl-containing silanes such as 3-aminopropyltriethoxysilane, N-$\beta$-(aminoethyl)-1-aminopropyltrimethoxysilane, and the like.

The alkali metal titanate fibers are single crystals, and for use herein should contain less than 5% water by weight, preferably less than 1% water. The preferred titanate fiber is potassium titanate. The fibers should have a diameter of between about 0.05–0.3 micron, preferably 0.1–0.2 micron; and a length to diameter ratio of at least 15:1, preferably at least 25:1, and most preferably between 30:1 and 50:1. The alkali metal titanate fibers should be present in an amount between about 1 and 20% by weight based on the weight of the composition, preferably between 5 and 10%. The alkali metal can be sodium, potassium, lithium, rubidium and the like.

The compositions of this invention may, of course, contain conventional additives. These include mold lubricants such as stearyl alcohol, metallic stearates, ethylene bis-stearamide, and the like; heat stabilizers such as copper salts and alkali metal halides; and pigments.

Any of several methods for mixing the ingredients of the resin composites are used so long as good dispersibility is obtained. Ordinarily, the polyamide ingredient is in the form of a molding powder, i.e., as granules or cubes, although any form suitable as a feed to an extrusion apparatus is satisfactory. Preferably, the ingredients are melt blended by feeding them into an extruder either individually, premixed, or partly premixed, in any combination. For convenience, a twin-screw extruder is preferred.

The compositions of this invention can be injected under normal injection-molding pressure into molds for shaping into molded articles.

In the examples which follow:

Tensile strength and Elongation were measured as described in ASTM D–638.

Flexural Modulus was measured as described in ASTM D–790. It is a measure of stiffness.

Heat Distortion Temperature is a test combining the effect of creep and flexural modulus versus temperature, moisture content and thermal history. It was measured as described in ASTM D–648–72.

Izod Impact was measured as described in ASTM D–256.

Gardner Impact was measured by using a Gardner Laboratory Impact tester (model IG–1125) using a sample holder that had a 1.5 inch diameter hole under the point of impact. This opening and the 0.25 inch radius tip on the 4 pound dart correspond to the specifications of Procedure B in ASTM D–3029–72. The test specimen, a 5 x 3 x ⅛ inch plaque, was placed over the hole, unclamped and the dart dropped from a height determined by the staircase method as in Section 11, ASTM D–3029–72, varying height rather than weight. Data are reported as average impact at break in foot-pounds/inch, correcting for sample thickness.

Test specimens used to determine properties were stored, prior to testing in glass jars sealed with tape until tested dry-as-molded. All physical tests were on dry-as-molded ⅛ inch thick specimens except Heat Distortion Temperature, which was measured on 5 x ½ x ⅛ inch bars annealed 0.5-hour in 150° C. silicone oil.

In the following examples and comparisons, all parts and percentages are in parts by weight unless otherwise specified. The examples illustrate the compositions of the invention.

EXAMPLE 1

A premix was made by surface coating 59.8% polyhexamethylene adipamide (Zytel® 101) having a relative viscosity of between about 48 and 52, with 0.2% (0.5% based on mineral filler) of 3-aminopropyltriethoxysilane. 35.0% of a mineral filler of wollastonite (calcium silicate, obtained from Interpace Corporation as P–4 wollastonite) containing less than 2% water in which at least 70% of the mineral filler particles were less than 10 microns in size and in which the particles had an average size between about 1–5 microns, and 5.0% potassium titanate fibers (Fibex® D, obtained from the Du Pont Company) containing less than 1% water, were then added.

The premix was starve fed at about 25 p.p.h. (11.36 kg./hr.) to a screw extruder (a Wernar & Pfleiderer ZSK–28). The extruder had a screw configuation and barrel temperature profile as follows:

| Temperature (° C.) | Screw configuration, type (No. of elements) |
|---|---|
| Rear, 265–270. | 031-024/024. |
| Front, 270–280. | 031-045/045/125/2 feed. |
| Die, 275–280. | 031-045/045 R transition. |
| | 031-045/045. |
| Other data | 031-030/060 (3). |
| Vacuum, 30 in. (76.20 cm.) | 037-305/045 kneading block. |
| Screw, 175–225 r.p.m. | 061-030/010 reverse. |
| | 031-045/045 (2) vacuum port. |
| | 031-045/045 (2). |
| | 031-030/030. |
| | 031-024/048 (2). |
| | Tip. |

The pelletized product was dried overnight in a 70–80° C. oven with about 20 inch vacuum, then molded into test bars (5 x 0.5 x ⅛ inch) (12.7 x 1.27 x 0.32 cm.) on a 3-ounce Van Dorn reciprocating screw molding machine. Plaques (5 x 3 x ⅛ inch and 5 x 3 x 1/16 inch) (12.7 x 7.62 x 0.32 cm. and 12.7 x 7.62 x 0.16 cm.) were molded on a 6 ounce Van Dorn reciprocating screw molding machine. Generally, the molding conditions were as follows:

| | 3-oz. Van Dorn | 6-oz. Van Dorn |
|---|---|---|
| Temperature (° C.): | | |
| Rear | 270 | 280. |
| Center | 275 | 280. |
| Front | 280 | 280. |
| Nozzle | 280 | 280. |
| Melt | 295 | 295. |
| Mold | 90 | 90. |
| Cycle (sec.): | | |
| Injection | 15 or 20 | 15 or 20. |
| Hold | 25 or 20 | 25 or 20. |
| Ram | Fast | Fast. |
| Screw (r.p.m.) | 60 | 60. |

Physical properties were measured on dry-as-molded test specimens and are tabulated in Table 1.

Comparison Tests

Compositions for comparison were prepared as in Example 1. The compositions contained the same polyamide, mineral filler, and silane as used in Example 1. The compositions are tested as follows:

Comparison A (Wollastonite Composition):

| | Percent |
|---|---|
| Polyamide | 59.8 |
| 3-aminopropyltriethoxysilane | 0.2 |
| P–4 Wollastonite | 40 |

Comparison B (Glass Containing Composition):

| | |
|---|---|
| Polyamide | 59.8 |
| 3-aminopropyltriethoxysilane | 0.2 |
| P–4 Wollastonite | 35 |
| Glass fiber (OCF K 828, ⅛ in. chopped strand fiber) | 5 |

Comparison C

A third comparison composition was prepared by mixing glass fibers (the same as used in Comparison B) with the same polyamide used in Example 1 until the mixture contained 15% glass by weight and extruding the mixture through a 2 inch Sterling single screw extruder having a rear temperature of 275–300° C., a center temperature of 285° C., a front temperature of 280° C., a die temperature of 270–285° C. and a melt temperature of 290–305° C. The vacuum was 27–28 inches; the screw velocity 40–50 r.p.m. and the screw a 31:1 L/D general purpose design with gradual transition and vacuum extension.

Plaques and bars were molded from these composition as in Example 1 and physical properties measured on dry-as-molded test specimens. The properties are tabulated in Table 1.

TABLE 1

| Composition | Tensile strength (p.s.i.) | Ultimate elongation (percent) | Flexural modulus (M p.s.i.) | Heat distortion temperature DTUL at 264 p.s.i. (° C.) | Izod impact strength (ft.-lbs./in.) | |
|---|---|---|---|---|---|---|
| | | | | | Notched | Unnotched |
| Example 1 (5% potassium titanate, Fybex® D 35%, P-4 Wollastonite) | 13,900 | 5.7 | 889 | 181 | 0.88 | 17 |
| Comparison A (40% P-4 Wollastonite) | 13,400 | 4.6 | 664 | 171 | 0.67 | 16 |
| Comparison B (35% P-4 Wollastonite, 5% glass fiber) | 14,500 | 4.7 | 851 | 170 | 0.71 | 10 |
| Comparison C (15% glass fiber) | 16,700 | 2.3 | 816 | 244 | 0.70 | 10 |

As shown by the Table, the composition of Example 1 exhibits better elongation and notched Izod values than either comparison compositions A or C and also better than comparison composition B which is presented herein to show there is no synergistic effect upon combining the mineral filler and glass fibers.

EXAMPLE 2

The procedure of Example 1 was followed to prepare two compositions of the following ingredients:

Composition 1:
 69.85% polyamide (the polyamide used in Example 1)
 20% of a mineral filler of silica particles containing less than 2% water in which at least 98% of the particles are less than 10 microns in size and have an average size between about 1–5 microns (Penna. Sand and Glass Company—Min-U-Sil® 10)
 0.15% 3-aminopropyltriethoxysilane
 10% of the fibrous potassium titanate used in Example 1

Composition 2:
 59.8% polyamide (the polyamide used in Example 1)
 30% of the silica used in composition 1
 0.2% 3-aminopropyltriethoxysilane
 10% of the fibrous potassium titanate used in Example 1

The mixture of each was extruded as in Example 1, and molded as in Example 1.

COMPARISON TESTS

Comparison Composition A

A composition of about 60% of the polyamide used above, 0.2% of the silane used above and 40% of the silica used above was prepared, extruded and molded as above.

Comparison Composition B

A composition of about 60% of the polyamide used above, 0.2% of the silane used above, 30% of the silica used above and 10% of the glass fiber used in Comparision Composition C of Example 1 was prepared, extruded and molded as above.

Comparison Composition C

Glass-containing Composition C of Example was used as Comparison Composition C of this Example.

Properties are tabulated in Table 2.

TABLE 2

| Composition | Tensile strength (p.s.i.) | Ultimate elongation (percent) | Flexural modulus (M p.s.i.) | Heat distortion temperature, DTUL at 264 p.s.i. (° C.) | Izod impact strength (ft.-lbs./in.) | | Gardner impact strength (ft.-lbs./in.) | Surface appearance |
|---|---|---|---|---|---|---|---|---|
| | | | | | Notched | Unnotched | | |
| Example 2: | | | | | | | | |
| Composition 1 | 13,800 | 7.1 | 702 | 167 | 1.43 | 43 | 60 | Smooth. |
| Composition 2 | 14,200 | 7.5 | 758 | 175 | 1.21 | 46 | 20 | Fairly smooth. |
| Comparison: | | | | | | | | |
| Composition A (40% silica) | 13,120 | 6.8 | 725 | 157 | 1.02 | 41 | 90 | Poor. |
| Composition B (30% silica, 10% glass fiber) | 15,190 | 4.2 | 850 | 191 | 0.63 | 11 | 17 | Do. |
| Composition C (15% glass fiber) | 16,700 | 2.3 | 816 | 244 | 0.70 | 10 | 10 | Do. |

As shown in Table 2, the compositions of this invention have better notched Izod values and better surface appearance than any other comparison compositions in Example 2. They also have better Heat Distortion Temperatures than Comparison Composition A and better elongation than Comparison Compositions B and C.

EXAMPLE 3

The procedure of Example 1 was followed to prepare, extrude and mold the following compositions:

A.

49.8% of the polyamide used in Example 1
10% of polycaprolactam having a relative viscosity between 41 and 52 (Plaskon® 8200—Allied Chemical Company)
30% of the silica mineral filler used in Example 2
0.2% 3-aminopropyltriethoxysilane
10% of the fibrous potassium titanate used in Example 1

B.

59.8% polyamide (same as used in Example 1)
30% silica (used in Example 2)
0.2% 3-aminopropyltriethoxysilane
10% fibrous potassium titanate containing less than 5% water (Fybex® L)

C.

49.8% of the polyamide of Example 3A
10% of the polycaprolactam of Example 3A
0.2% 3-aminopropyltriethoxysilane
10% of the fibrous potassium titanate used in Example 3B

D.

49.8% of the polyamide of Example 3A
10% of the polycaprolactam of Example 3A
30% of the Wollastonite mineral filler used in Example 1
0.2% 3-aminopropyltriethoxysilane
10% of the fibrous potassium titanate used in Example 3C.

Properties are tabulated in Table 3.

TABLE 3

| Composition | Tensile strength (p.s.i.) | Ultimate elongation (percent) | Flexural modulus (M p.s.i.) | Heat distortion temperature, DTUL at 264 p.s.i. (°C.) | Izod impact strength (ft.-lbs./in.) | | Gardner impact strength (ft.-lbs./in.) | Surface Appearance |
|---|---|---|---|---|---|---|---|---|
| | | | | | Notched | Unnotched | | |
| A | 13,600 | 14.4 | 741 | 163 | 1.27 | 47 | 93 | Smooth. |
| B | 14,100 | 8.3 | 788 | 182 | 1.06 | 38 | 45 | Fairly smooth. |
| C | 13,400 | 9.1 | 806 | 157 | 1.26 | 43 | 83 | Smooth. |
| D | 14,700 | 5.3 | 826 | 188 | 0.89 | 21 | 16 | Do. |

The preceding representative examples may be varied within the scope of the disclosure herein, as understood and practiced by one skilled in the art, to achieve substantially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A polyamide composition comprising (1) 50–75% by weight based on the weight of the composition of at least one high molecular weight polyamide, (2) between about 20–48.5% by weight based on the weight of the composition of a particular mineral filler comprising silica or a metallic silicate having a moisture content of less than 2% by weight of the filler and having at least 70% of its particles less than 10 microns in size and having an average particle size of between about 1–5 microns, (3) between about 0.25 and 2% by weight based on the weight of the mineral filler of a silane coupling agent, and (4) between about 1 and 20% by weight based on the weight of the composition of a fibrous alkali metal titanate containing less than 5% water by weight of the titanate.

2. An injection molded article of the composition of Claim 1.

3. The composition of Claim 1 wherein the alkali metal titanate is potassium titanate.

4. The composition of Claim 3 wherein the potassium titanate is present in an amount of between 5–10% by weight based on the weight of the composition.

5. The composition of Claim 1 wherein the mineral filler is silica.

6. The composition of Claim 5 wherein the silica comprises 25–35% by weight based on the weight of the composition.

7. The composition of Claim 6 wherein the silica contains less than 2% water by weight and at least 98% of the silica particles are less than 10 microns and the average particle size is 1–3 microns.

8. The composition of Claim 6 wherein the alkali metal titanate is potassium titanate.

9. The composition of Claim 8 wherein the potassium titanate is present in an amount between 5–10% by weight based on the weight of the composition.

10. The composition of Claim 1 wherein the mineral filler is calcium silicate.

11. The composition of Claim 10 wherein the alkali metal titanate is potassium titanate.

12. The composition of Claim 1 wherein the polyamide is polyhexamethylene adipamide, a blend of polyhexamethylene adipamide and polycaprolactam, or a copolymer of polyhexamethylene adipamide and polycaprolactam.

13. The composition of Claim 12 wherein the silane coupling agent is 3-aminopropyltriethoxysilane or N-β-(aminoethyl)-γ-aminopropyltrimethoxysilane.

14. The composition of Claim 12 wherein the mineral filler is silica.

15. The composition of Claim 14 wherein the alkali metal titanate is potassium titanate.

16. The composition of Claim 15 wherein the polyamide is polyhexamethylene adipamide.

17. The composition of Claim 1 which contains additionally, mold lubricants, heat stabilizers, pigments, or mixtures thereof.

References Cited

UNITED STATES PATENTS

| 3,418,268 | 12/1968 | Hedrick | 260—37 |
| 3,129,105 | 4/1964 | Berry | 106—55 |
| 3,514,403 | 4/1970 | Muendel | 252—62 |

LEWIS T. JACOBS, Primary Examiner

R. ZAITLEN, Assistant Examiner